July 15, 1958   J. O. SCHULTZ ET AL   2,842,929
CORN PICKER SNAPPING ROLLS

Filed June 6, 1956   2 Sheets-Sheet 1

INVENTORS
T. F. CRUSINBERRY
J. O. SCHULTZ
BY
E. C. McRAE
J. R. FAULKNER
P. F. HILDER
ATTORNEYS

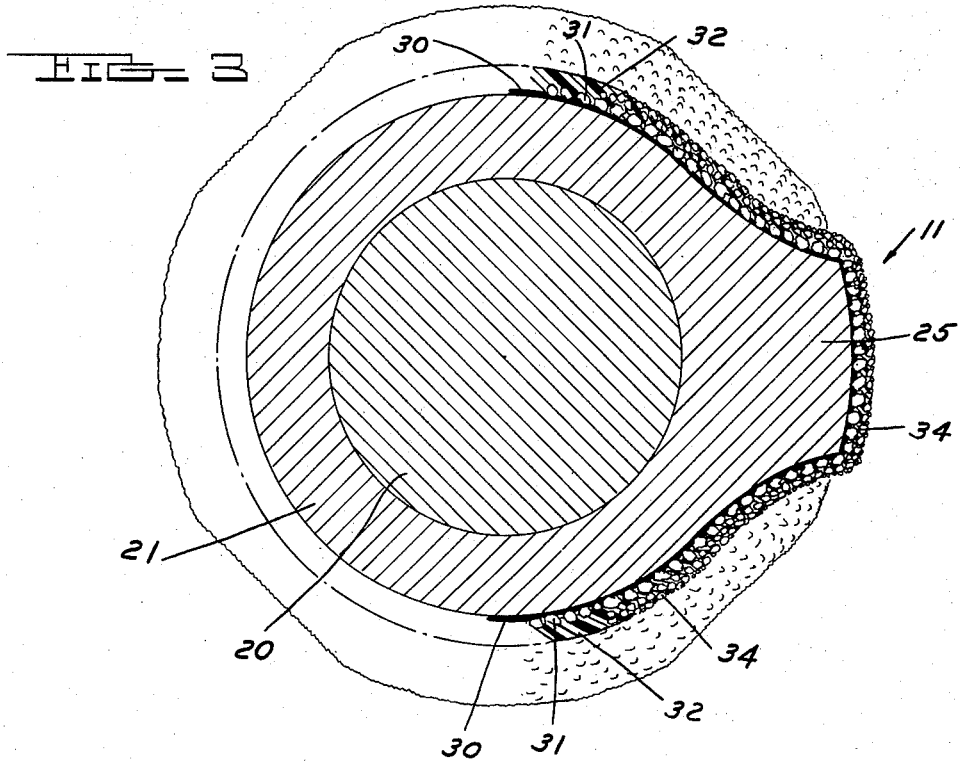
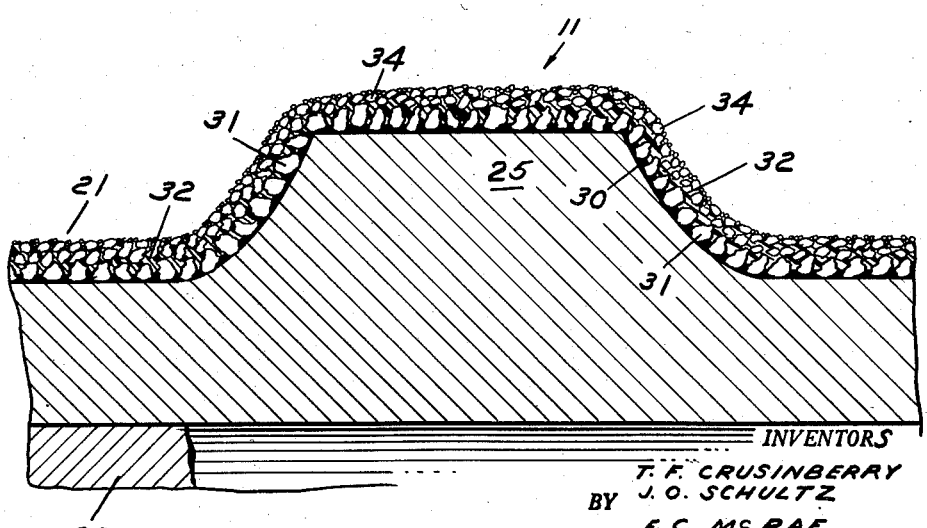

United States Patent Office 2,842,929
Patented July 15, 1958

2,842,929
CORN PICKER SNAPPING ROLLS

Julius O. Schultz, Mount Clemens, and Thomas F. Crusinberry, Clawson, Mich., assignors to Ford Motor Company, Dearborn, Mich., a corporation of Delaware Application June 6, 1956, Serial No. 589,645

7 Claims. (Cl. 56—103)

This invention relates to mechanical corn pickers (including corn harvesters), and more particularly to snapping rolls for removing ears of corn from corn stalks.

Mechanical corn pickers are provided with a snapping unit for breaking the ears of corn from the stalks. The snapping unit includes a pair of juxtaposed, counterrotating snapping rolls designed to pass the stalks between the rolls, the spacing of the rolls being insufficient to pass the ears, whereby the ears are snapped from the stalks and are often then conducted to the corn husking portion of the machine.

The snapping rolls are generally cylindrical rolls which often are formed of cast iron and provided with a surface ridge in the form of a raised spiral extending in a direction to conduct the stalks rearwardly of the rolls as they are rotated. Snapping of the ears from the stalks occurs at the rear portions of the rolls, and in this portion the rolls may be provided with integral notched extensions of the raised spiral to engage the nodes of the stalks and draw the stalks between the rolls.

In the corn picker according to the present invention, one of the snapping rolls, in the rear, snapping zone thereof, is provided with a surface formed of granular or subangular abrasive particles in a binder. The increased frictional engagement of the surface of such a roll with stalks permits the use of less aggressive rolls; i. e., rolls with fewer sharp-edged, raised portions and lessens clogging of the rolls from stalks that fail readily to pass the rolls, contributing to an efficiently operating unit in which shelling of corn from contact of the ears with the rolls is reduced to a minimum.

Among the objects of the present invention are to provide durable, long-lived corn picker snapping rolls of increased efficiency that will more readily draw the stalks through the rolls, that will have a lessened tendency to clog, that will function without adjustment over a wide range of moisture content of the stalk, that will have a lessened tendency to shell corn from the ears; and generally to improve corn picker snapping rolls of the type described.

Other objects, and the nature and scope of the invention will be more apparent from the detailed description to follow.

Our invention is clearly defined in the appended claims. In the claims, as well as in the description, parts may at time be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification in which:

Figure 3 is an enlarged, somewhat diagrammatic cross section of one of the snapping rolls, taken on the line 3—3 of Figure 1.

Figure 4 is an enlarged, fragmentary longitudinal section of the roll shown in Figure 3, taken generally along the line 4—4 of Figure 2.

Figure 1:
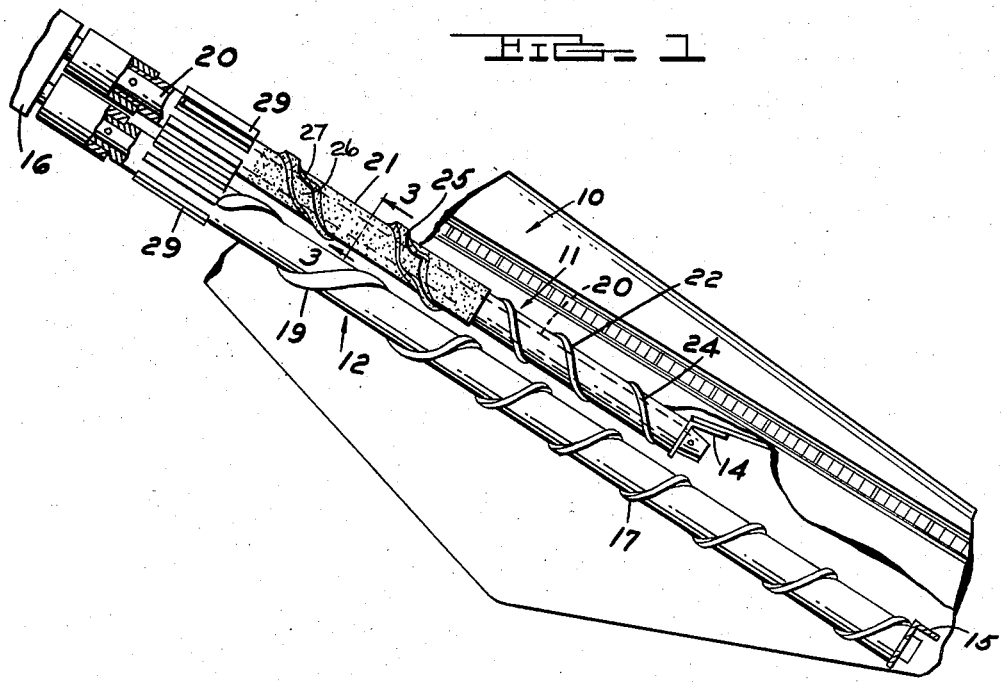
Figure 1 is a somewhat diagrammatic side elevation of a portion of the snapping unit of a corn picker, the snapping rolls being shown partly in side elevation and partly in section, and associated parts of the unit being shown.
Figure 2:
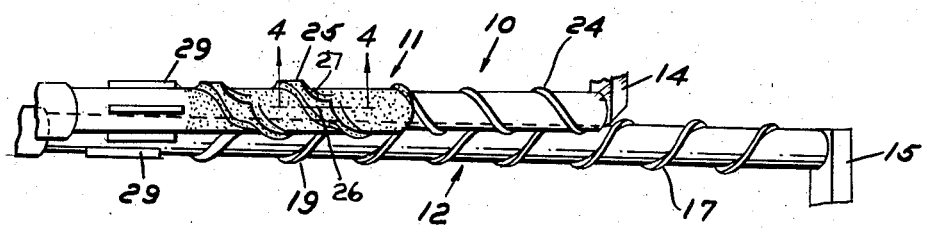
Figure 2 is a top plan view of the snapping rolls, portions of the lower bearings being indicated.

The corn picker snapping unit 10 of the present invention is in many respects conventional. It is provided with gathering points, not shown, for directing the corn stalks into the snapping unit and between a pair of juxtaposed, counterrotating snapping rolls 11 and 12. The snapping rolls 11 and 12 are rearwardly and upwardly inclined and feed the stalk downwardly between the rolls as the picker progresses forwardly, the stalk passing between the rolls and the ears of corn being too large to pass between the roll and being snapped from the stalks. Thus, the stalks are for the most part left standing in the field and the ears, which sometimes are husked at the time they are snapped from the stalks, are collected by the snapping unit and conveyed up an elevator to a husking bed or to a towed wagon, none of which are shown in the drawings. This invention is directed to the improved snapping rolls for increasing the efficiency of the snapping unit and reducing the shelling of kernels of corn from the ears.

Referring to the drawings, the upper snapping roll 11 and lower snapping roll 12 are supported at their lower ends in the snapping unit 10 by brackets 14 and 15 respectively. The upper ends of the rolls 11 and 12 are supported and driven by a gear box 16 mounted within the snapping unit. Preferably, the upper snapping roll 11 is mounted more or less above the lower snapping roll 12 and the axes of the rolls are forwardly divergent and somewhat skewed; i. e., not within a common plane. One or both of the brackets 14 or 15 may be capable of limited adjustment to change the spacing of the rolls when desired.

The lower roll 12, which is more or less conventional, is preferably formed of a generally cylindrical cast steel body having a raised, somewhat rounded spiral bead or flute 17 extending for most or all of the length of the roll. The bead 17 extends about the roll in a direction to feed the stalks of corn upwardly between the rolls as the rolls are rotated, and the bead may be somewhat larger and more aggressive in the snapping zone 19 adjacent the rear portion of the rolls where snapping of the corn from the ears principally occurs.

The upper snapping roll 11 preferably is formed of a central shaft or core 20 provided with one or more generally cylindrical roll portions, two roll portions 21 and 22 being shown. The roll protions 21 and 22 may be slipped over the shaft or core 20 from its lower end, and rotate with the shaft. This construction facilitates substitution and replacement of roll sections.

The lower roll portion 22 of roll 11 has a generally cylindrical surface which is somewhat similar to the surface of the lower snapping roll 12, and is provided with a spiral raised bead or flute 24 generally similar to the bead 17 on the lower roll but of opposite hand. Preferably, the bead 24 has the same pitch as bead 17 of the lower roll and is out of phase therewith so that as the rolls are counterrotated, the beads will not interfere, but will progress the stalks rearwardly between the rolls.

The upper roll portion 21 of roll 11 is likewise generally cylindrical and is provided with a raised bead or flute 25 which preferably is a continuation in phase of the flute 24 of the lower roll portion 22. The raised bead or flute 25 of roll portion 21 is provided with notches 26 having a concave leading edge 27 to facilitate gripping of the nodes on corn stalks by the upper roll and passage of the stalks between the rolls. The rearward ends of both upper and lower rolls 11 and 12 preferably are provided with a plurality of removable lugs 29 which may be bolted onto the rolls and clear the rolls of trash which might otherwise accummulate and interfere with snapping of the corn and passage of the snapped ears up the elevator (not shown).

The surface of upper roll portion 21 of the snapping roll 11 is formed of granular or subangular abrasive particles which are at least partially imbedded in a bonding agent. The roll portion 21 is preferably formed by coating a cast metal roll, which has already been provided with the desired contour of spiral flute 25, with a more or less uniform coating of bonded abrasive particles, as will be described. Alternatively, the roll portion 21 might consist of a thicker layer of bonded abrasive particles cast in the desired surface form on a more or less smooth cylindrical roller or sleeve as a core.

The cast iron roll portion 21, if formed as an abrasive-coated cast iron roll, is first cleaned to remove all dirt and scale and provide a good surface to which the resin-bonded abrasive coating will adhere. The roll surface may be conditioned by sandblasting. After this, the roll surface is thoroughly dried to remove any surface moisture, preferably by heating the entire roll portion to a temperature of approximately 150° F. After the roll portion has been heated for drying, preferably it is then permitted to cool to a surface temperature of about 125° F. before applying the resin coating in order to prevent excessively fast curing of the resin. The residual heat within the roll can be utilized to supply heat for curing the resin.

The resin bonding agent for the abrasive is preferably an epoxy type resin plus appropriate hardener or catalyst, to which has been added sufficient inert filler to increase viscosity of the resin and prevent creep and sag of the plastic coating on the roll before curing. The filler may consist of an air-borne silica aerogel such as Santocel, a product of Monsanto Chemical Company, or Cab-O-Sil, a product of Godfrey L. Cabot, Inc. The resin coating is applied at room temperatures to the surface of the roll by brush or otherwise until a layer 30 of plastic, which may be about 60 mils in thickness, coats the exterior surface of the roll.

Immediately after applying the resin to the surface of the roll portion 21, the granular abrasive particles may be applied thereto. These particles, which may consist of a layer 31 of extra coarse grained silica (between U. S. mesh sizes #6 and #30), or similarly sized particles of flint, silicon carbide, aluminum oxide, or other abrasive particles, are then applied to the resin coating of the roll, preferably by rolling the roll in a quantity of particles so that the particles will firmly imbed themselves in the resin layer.

Residual heat in the roll portion 21 may be sufficient to cure the coating of resin. However, baking the roll for a period of 15 to 20 minutes at a temperature of about 180° F. will produce a harder and tougher resin bond.

After application of the abrasive particles and curing of the resin, the surface of the roll portion 21 is given a second brush coating 32 of plastic. The second coating of resin, which may be of the same composition as the first coating but preferably is of lower viscosity, serves to bond more completely the layer of abrasive particles previously applied. Preferably, after application of the second layer of resin, a second layer 34 of abrasive particles (between U. S. mesh sizes #8 and #50) is applied to the uncured second coat 32 of resin by rolling the roll in a supply of particles or otherwise. Preferably, the second layer 34 of abrasive particles is somewhat finer than the first layer 31 so as in part to fill the voids between the larger particles. If desired, this may be followed by similar application of a third layer of still finer particles without, however, applying additional resin.

After application of the additional layer 34 of particles, the roll portion 21 preferably is again baked as described above to cure the second layer 32 of resin. The finished rolls may be maintained at a room temperature above about 77° F. for a period of six to eight hours, upon which the resin coating will be set hard. Full room temperature cure will take place over the next seven days, after which the roll portion 21 will be ready for service.

While we have described the preferred method for application of the bonded granular abrasive particles to the surface of the upper roll portion 21, obviously there are many alternative methods, and any method that will provide a coating in which the granular abrasive particles are sufficiently held against displacement so as to provide a roll of satisfactory operating characteristics and life, will be satisfactory.

We claim:

1. In a corn picker, a pair of counterrotating juxtapositioned snapping rolls for snapping ears of corn from corn stalks, one of said rolls having the upper end portion of its surface composed of granular abrasive material at least partially imbedded in a bonding agent composed principally of an epoxy resin, and a raised spiral flute extending for a major portion of said one roll, including that portion of the roll surfaced with granular abrasive material.

2. A corn picker snapping roll, comprising a generally cylindrical roll having a fluted surface, the surface being covered at least in part by subangular abrasive particles at least partially imbedded in and bonded to the roll by an adherent coating of epoxy resin on the roll, the fluted surface including that portion of the roll surface covered by subangular abrasive particles.

3. A corn picker snapping roll, comprising a generally cylindrical roll having a fluted surface, the fluted surface being covered at least in part by granular abrasive particles at least partially imbedded in and bonded to the roll by an adherent coating of resin on the roll.

4. A corn picker snapping roll, comprising a generally cylindrical roll having at least one raised spiral flute extending throughout most of the length of the roll, the forward end portion of the roll having a relatively smooth metallic surface and the rearward end portion of the roll, including a part of the fluted portion, having a surface coating of granular abrasive particles at least partially imbedded in and bonded by an adherent body of synthetic resin.

5. A corn picker snapping roll, comprising a generally cylindrical roll having at least one raised spiral flute extending throughout most of the length of the roll, the forward end portion of the roll having a relatively smooth metallic surface and the rearward end portion of the roll, including a part of the fluted portion, having a surface coating of granular abrasive particles at least partially imbedded in and bonded by an adherent body of epoxy resin.

6. A corn picker snapping roll, comprising a generally cylindrical roll having at least one raised spiral flute extending throughout most of the length of the roll, the forward end portion of the roll having a relatively smooth metallic surface and the rearward end portion of the roll, including a part of the fluted portion, having a surface coating of granular abrasive particles at least partially imbedded in and bonded by an adherent bonding agent.

7. A corn picker snapping roll, comprising a generally cylindrical roll having a spirally fluted surface throughout substantially its entire length, one portion of the roll having a relatively smooth metallic surface and another portion of the roll, including at least a part of the fluted portion, having a surface covered by granular abrasive particles bonded to the roll by an adherent bonding agent.

References Cited in the file of this patent

UNITED STATES PATENTS

| | | |
|---|---|---|
| 1,026,585 | Stahl et al. | May 14, 1912 |
| 1,670,225 | Zylstra | May 15, 1928 |
| 2,656,666 | Collins | Oct. 27, 1953 |